Dec. 18, 1956 — A. H. DE MOSS — 2,774,248
MULTIPLE SPEED DRIVE SYSTEM
Filed May 7, 1953 — 5 Sheets-Sheet 1

Inventor:
Albert H. DeMoss
By Zabel, Baker, York, Jones & Dithmar
Attys

Dec. 18, 1956    A. H. DE MOSS    2,774,248
MULTIPLE SPEED DRIVE SYSTEM
Filed May 7, 1953    5 Sheets-Sheet 4

Inventor:
Albert H. DeMoss
By Zabel, Baker, York, Jones & Dithmar
Attys

Dec. 18, 1956  A. H. DE MOSS  2,774,248
MULTIPLE SPEED DRIVE SYSTEM
Filed May 7, 1953  5 Sheets-Sheet 5
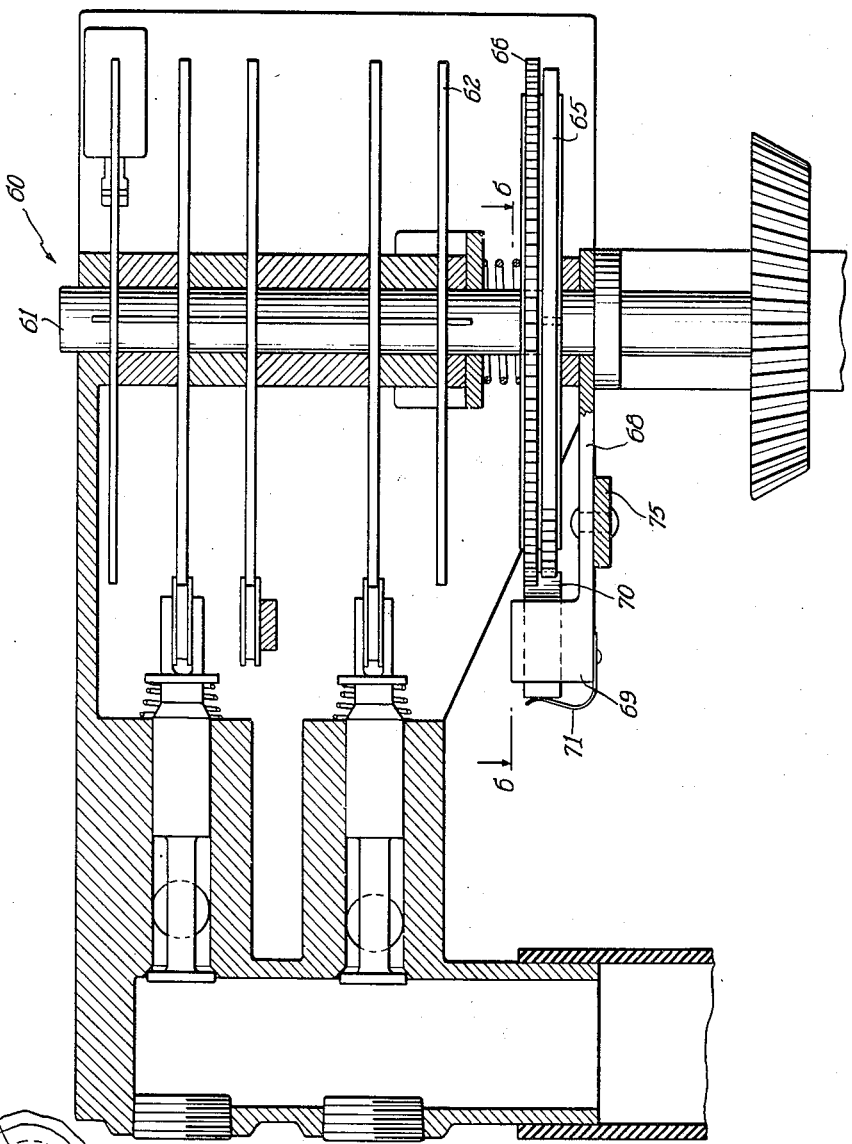
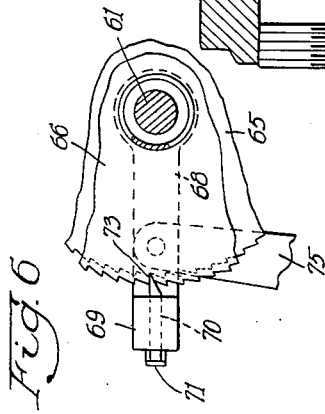
Inventor:
Albert H. DeMoss
By: Zabel, Baker, York, Jones & Dithmar
Attys

United States Patent Office 2,774,248
Patented Dec. 18, 1956

2,774,248

MULTIPLE SPEED DRIVE SYSTEM

Albert H. De Moss, Milwaukee, Wis.

Application May 7, 1953, Serial No. 353,490

12 Claims.  (Cl. 74—217)

My invention relates to a multiple speed drive system wherein a single speed drive element imparts selective multiple speeds to a driven element.

This application is a division of my copending application for Cleaning Machine and Method of Cleaning, Serial No. 165,330, filed May 31, 1950.

The system of my invention has utility in numerous applications, and it has been found particularly satisfactory for use in domestic laundry machines. It is here illustrated and described as applied to such a machine.

One object of my invention is to provide a multiple speed drive system comprising a combination of individual components which can be mass produced and easily assembled at extremely low cost compared with comparable systems heretofore known.

Another object of the invention is to provide a multiple speed drive system which is characterized by the facility with which the speed of the driven element may be changed from one speed to another.

Another object of the invention is to provide a multiple speed drive system which includes a mechanical timer device, driven from a continuously moving part of the system, and means responsive to such device for effecting speed changes automatically in predetermined time sequence.

Another object is to provide a system of this character which can be expected to have a long useful life substantially free of difficult maintenance problems.

Still another object of the invention, and one particularly related to the laundry machine application, is to provide a multiple speed drive system which can be satisfactorily powdered with a small and inexpensive motor, compared with motors heretofore considered necessary for laundry machines of comparable size and type. Such machines utilize a container rotatable in one direction at two different speeds, a low speed for washing and a high speed for extracting by centrifugal action. The present drive system has inertia members which function to reduce the power necessary to accelerate from low speed to high speed, thereby reducing the power requirements imposed on the motor.

Another object of the invention is to provide a multiple speed drive system which utilizes a plurality of pulleys, belts and simple clutches, all low cost, mass produceable elements. Expensive gears, clutches and carefully machined parts, other than simple bearings, are wholly eliminated.

Other objects, advantages and details of the invention will appear as the description proceeds, reference being had to the accompanying drawings which illustrate the drive system embodied in a laundry machine. It is to be understood, however, that the description and drawings are illustrative only and are not to be taken as limiting the invention except insofar as it is limited by the claims.

In the drawings:

Fig. 5 is a sectional view on line 5—5 of Fig. 1 showing a mechanical timer device;

Fig. 6 is a fragmentary sectional view on line 6—6 of Fig. 5;

Figure 1:
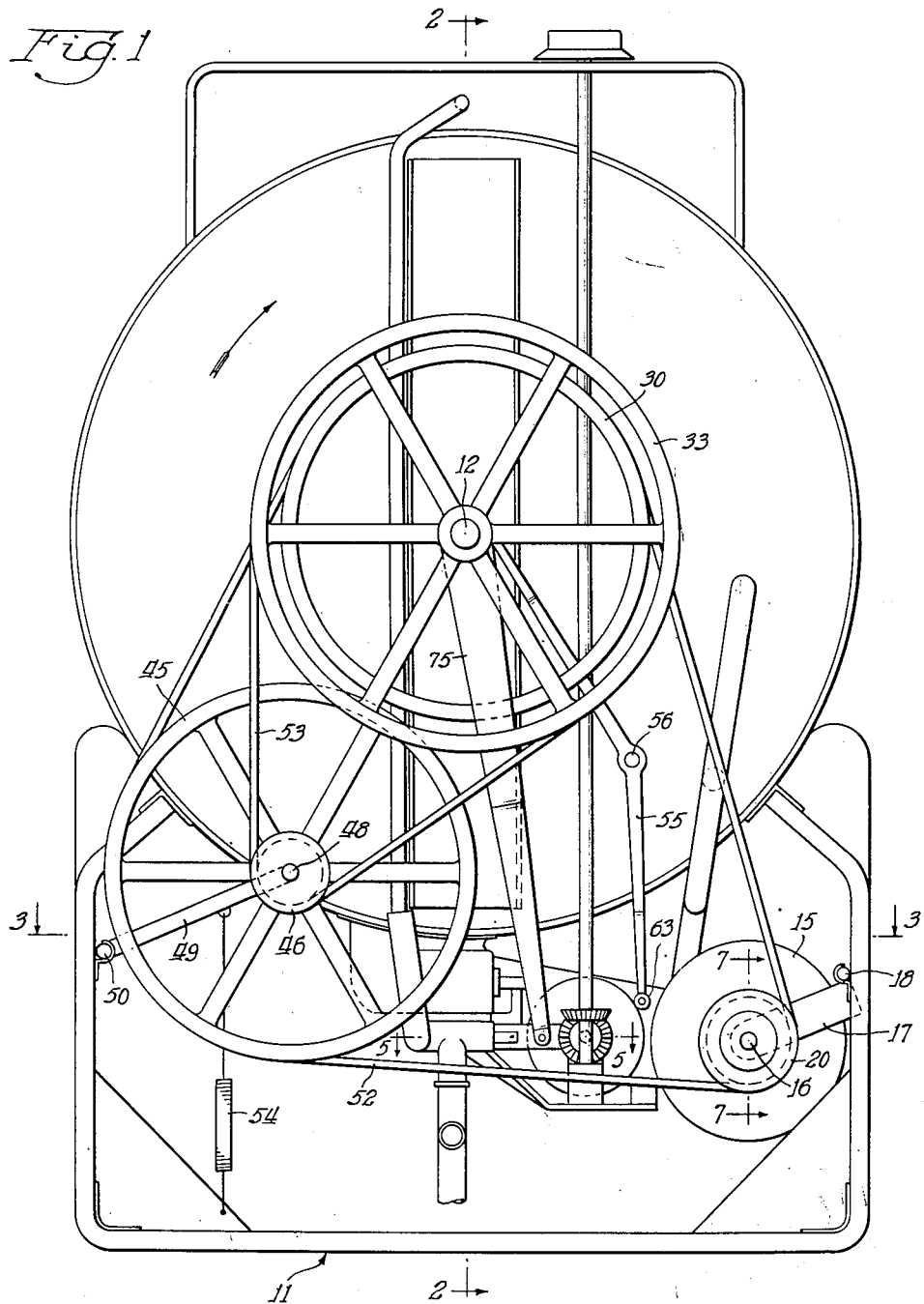
Fig. 1 is a rear elevational view of a laundry machine embodying the driven system of my invention, the back panel of the machine being removed.
Figure 2:
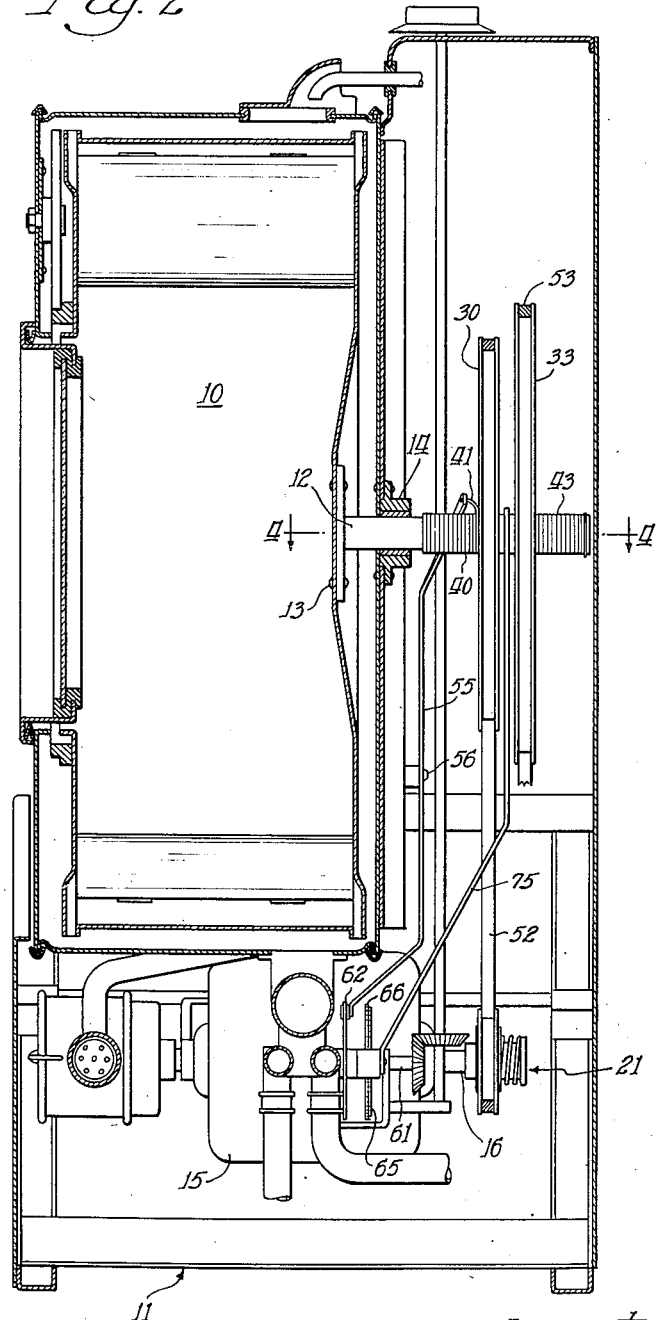
Fig. 2 is a vertical sectional view through the machine on line 2—2 of Fig. 1.
Figure 3:
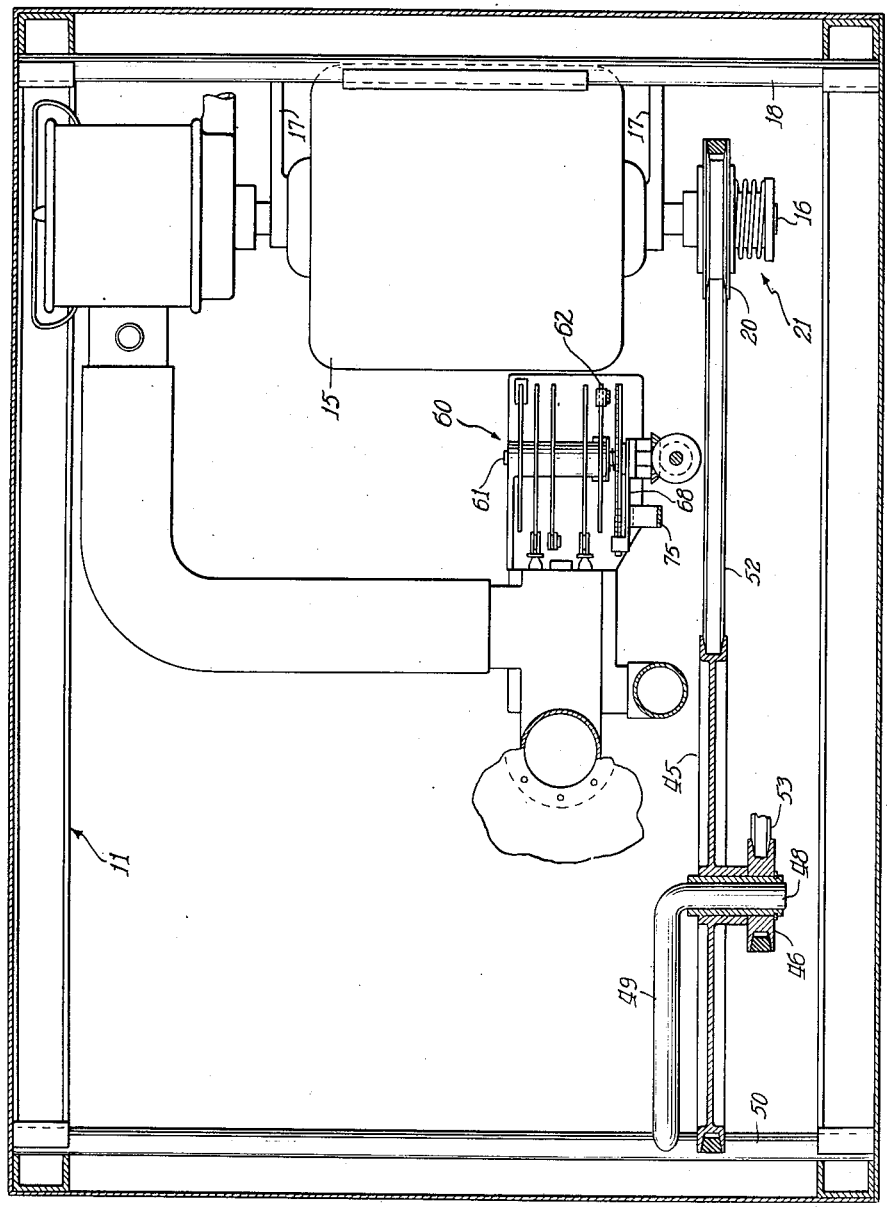
Fig. 3 is a horizontal sectional view on line 3—3 of Fig. 1.

Referring now to Figs. 1–3 of the drawings, the laundry machine in which I have chosen to illustrate the invention includes a rotatable container 10 (Fig. 2) mounted in a suitable frame 11. The drive system has a driven shaft 12 which is connected at 13 to container 10 and which is suitably journalled in a bearing 14 carried on frame 11.

A source of power such as electric motor 15 is mounted in the lower portion of frame 11. Motor 15, which may be of the split-phase type, powers a shaft 16 which is here called the drive shaft of the system.

Drive shaft 16 is journalled in and carried by supports 17—17 which are pivoted as shown at 18 (Fig. 1) to frame 11. The purpose of this pivoted arrangement will be mentioned later.

A drive pulley 20 is carried on drive shaft 16 (Figs. 1—3 and 7) in driven relation therewith. Pulley 20 may be keyed to shaft 16, or, as illustrated, it may be journalled thereon and related thereto by means of a simple friction clutch such as generally designated 21 and best shown in Fig. 7.

Figure 7:
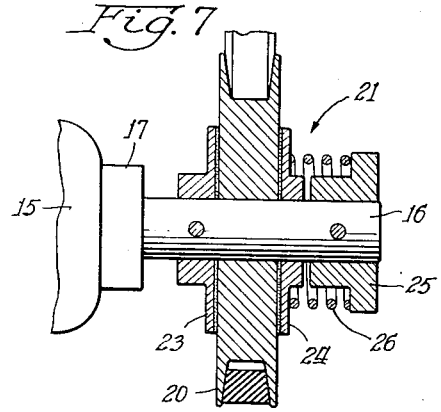
Fig. 7 is in part an elevational view and in part a sectional view on line 7—7 of Fig. 1.

Referring to Fig. 7, clutch 21 includes a collar 23 fixed to shaft 16 on one side of pulley 20. A generally similar collar 24 is carried on shaft 16 on the other side of pulley 20, but this collar is not fixed to the shaft. A third collar 25, fixed to shaft 16, is positioned adjacent collar 24, and a compressed spring 26 extends between the two collars 24 and 25. Spring 26, of course, establishes a frictional relationship between the two faces of pulley 20 and the collars 23 and 24. Under normal conditions, friction between the faces of pulley 20 and the respective collars 23 and 24 will cause the pulley to be driven by shaft 16. However, should an abnormal, harmful load be placed on pulley 20, the clutch will slip so that such load is not transmitted to motor 15.

Figure 4:
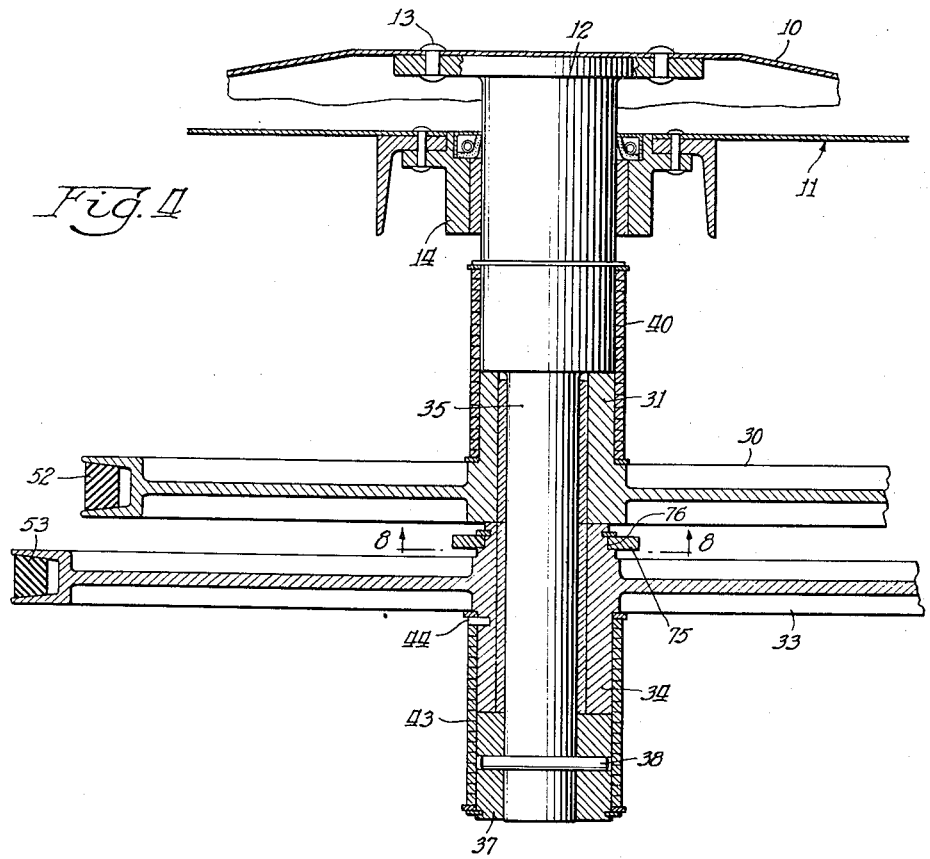
Fig. 4 is a sectional view on line 4—4 of Fig. 2.

Driven shaft 12, previously mentioned, is spaced from drive shaft 16 and is generally parallel therewith. A high speed pulley 30 having a hub 31 (Fig. 4) and a low speed pulley 33 having a hub 34 are journalled on driven shaft 12. These two pulleys continuously rotate during operation of the system. The portion of driven shaft 12 which carries pulleys 30 and 33 is reduced in diameter as shown at 35 so that the exterior surface of hub 31 is generally flush with the exterior surface of the adjacent unreduced portion of shaft 12. Pulleys 30 and 33 are held in proper position on reduced shaft portion 35 by means of a collar 37 which is keyed to the shaft by a pin 38. The exterior surface of collar 37 is substantially flush with the exterior surface of the adjacent hub 34 as clearly shown in Fig. 4.

Hub 31 of high speed pulley 30 and the adjacent unreduced portion of driven shaft 12 comprise two elements of a high speed spring clutch, the third element of which is an overrunning clutch spring 40 which loosely surrounds hub 31 and the adjacent portion of driven shaft 12. One end of spring 40 is outwardly bent as shown in Fig. 2 in such a way as to provide a projection 41. This projection cooperates with an actuator, later to be described, for controlling clutch action. The actuator when in one position holds the projection 41 and spring 40 against rotation, and in another position it is withdrawn to permit the spring to rotate with hub 31. When the actuator is in withdrawn position, the friction between rotating hub 31 and spring 40 is sufficient to cause a tightening of the spring convolutions with the result that the spring tightly grips both hub 31 and driven shaft 12. Thus, hub 31 drives shaft 12 through spring 40. When the actuator is positioned to engage projection 41 and prevent rotation of spring 40, the spring convolutions will tend to unwind, thereby releasing the clutch and breaking the drive connection.

A more or less similar spring clutch is provided between low speed pulley 33 and driven shaft 12. An overrunning clutch spring 43 surrounds hub 34 and adjacent collar 37. One end of spring 43 may be inwardly bent as shown at 44 and received within an opening formed in hub 34, or spring 43 may be mounted loosely both on hub 34 and collar 37. In either event spring 43 connects collar 37 and hub 34 in driving relation if the collar is not rotating at greater speed than hub 34. When collar 37 rotates at greater speed than hub 34, the case when the high speed clutch is engaged, friction between collar 37 and spring 43 merely tends to unwind and enlarge the spring so that the latter is overrun by the faster turning collar.

Pulleys 30 and 33, as mentioned, both are driven continuously with high speed pulley 30 rotating faster than low speed pulley 33. When high speed clutch spring 40 is held out of engagement by its actuator, shaft 12 is driven at low speed by low speed pulley 33 through spring 43. In this circumstance high speed hub 31 and driven shaft 12 both overrun spring 40. Alternatively, when the high speed clutch spring 40 is allowed by the actuator to engage shaft 12 and hub 31, shaft 12 is driven at high speed by high speed pulley 30 and shaft collar 37 overruns clutch spring 43.

Referring again to Fig. 1, the drive system includes an intermediate high speed pulley 45 and an intermediate low speed pulley 46, the two pulleys being ganged to rotate together. Pulleys 45 and 46 are carried on an intermediate shaft 48 which in turn is supported by arm 49 pivoted at 50 to frame 11. The purpose of pivotally supporting intermediate shaft 48, as well as drive shaft 16, previously mentioned, will presently be set forth.

A high speed belt 52 connects drive pulley 20, intermediate high speed pulley 45 and high speed pulley 30, while a low speed belt 53 connects intermediate low speed pulley 46 and low speed pulley 3.

Remembering that drive shaft 16 is pivotally supported at 18 with respect to frame 11, it will be noted that the weight of drive shaft 16, pulley 20 and, in the example shown, motor 15 develops a force which applies tension to high speed belt 52, thereby automatically insuring its proper relation with its respective pulleys. Similarly, the pivotal mounting of intermediate shaft 48 with respect to frame 11 enables the weight of shaft 48 and pulleys 45 and 46 to cooperate with the tension of belt 52 and thereby apply an independent tension on low speed belt 53. If additional tension on belt 53 is required, a spring 54 extending between arm 49 and a point on frame 11 may be provided. Thus, both belts are maintained under proper tension, and the relationship is not disturbed by different belt characteristics since the respective tension forces are substantially independent of each other.

Drive pulley 20, intermediate high speed pulley 45, high speed pulley 30 and its associated clutch spring 40 thus comprise a continuously rotating high speed drive between drive and driven shafts 16 and 12. Similarly, pulley 20, intermediate pulleys 45 and 46, low speed pulley 30 and associated clutch spring 43 comprise a continuously rotating low speed drive between the two shafts. Selective variation between the two drives is accomplished by means of the previously briefly mentioned actuator which engages and disengages projection 41 of high speed clutch spring 40.

The actuator may take the form of a finger member or lever 55 pivoted at 56 to a point on frame 11. Movement of lever 55 in one direction positions one end thereof to engage projection 41 of high speed clutch spring 40, while movement in the other direction withdraws the end out of engagement with the projection.

Figs. 1, 2, 3, 5 and 6 illustrate a suggested means for moving lever 55 according to predetermined time sequence. A timer device, generally designated 60 (Figs. 3 and 5), is mounted in frame 11. The device includes a rotatable cam shaft 61 to which is keyed a speed change cam 62. Lever 55 carries a cam follower 63 (Fig. 1) which engages cam 62. The shape of cam 62 is such as to impart the desired movement to follower 63 and lever 55 as the cam rotates, thereby changing from one driven speed to another according to predetermined time sequence.

Any suitable means may be employed for rotating cam shaft 61, and as here illustrated, the shaft is driven from some moving part of the drive system by means of a pawl and ratchet arrangement.

Referring to Figs. 5 and 6, a ratchet 65 is keyed to shaft 61. A second ratchet 66, of somewhat larger diameter than ratchet 65, is mounted on shaft 61 adjacent ratchet 65 but ratchet 66 is not keyed to the shaft. Rather, it is frictionally related to shaft 61. An arm 68 is journalled on shaft 61, the free end of the arm being provided with a boss 69. A pawl 70, biased by a spring 71, is mounted on boss 69, and it engages the toothed periphery of unkeyed larger ratchet 66. Arm 68 moves back and forth through a short arc by means presently to be described, and pawl 70 is effective to rotate ratchet 66 in a step by step manner.

One of the teeth, namely tooth 73 (Fig. 6), of ratchet 66 is deeper than the others, and when pawl 70 enters this tooth, as it does once per revolution of ratchet 66, the pawl also engages a peripheral tooth of ratchet 65 thereby advancing ratchet 65 and associated cam shaft 61 through one step. This arrangement provides a desired speed reduction between the two ratchets and imparts a speed to shaft 61 which is sensible for the timing required in a laundry machine of the type illustrated.

Figure 8:
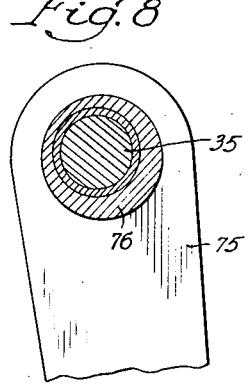
Fig. 8 is a sectional view on line 8—8 of Fig. 4.

Pawl arm 68 is moved back and forth by means of a pitman rod 75 connected between it and an eccentric 76 (Fig. 8) formed on one end of low speed hub 34 between the two pulleys 30 and 33. Movement of pitman rod 75 imparts the aforesaid back and forth movement to arm 68. The drive system thus is provided with an integral timer device which is driven from a moving part of the system, thereby eliminating the need for an independent source of timer power.

From the above description it is thought that the construction and advantages of my invention will be readily apparent to those skilled in the art. Various changes in detail may be made without departing from the spirit or losing the advantages of the invention.

Having thus described my invention, what I claim as new and desire to secure by Letters Patent is:

1. A multiple speed drive system comprising a rotatable drive shaft, a drive pulley journalled on said drive shaft, a spring biased friction clutch connecting said pulley with said shaft, a rotatable driven shaft parallel to and spaced from said drive shaft, a high speed pulley and a low speed pulley journalled on said driven shaft, an intermediate shaft parallel to and spaced from said drive and driven shafts, an intermediate high speed pulley and an intermediate low speed pulley ganged together and carried on said intermediate shaft, a belt connecting said drive pulley, said high speed pulley and said intermediate high speed pulley, a belt connecting said low speed pulley and said intermediate low speed pulley, an overrunning spring clutch connecting said low speed pulley with said driven shaft, an overrunning spring clutch connecting said high speed pulley with said driven shaft, and control means in operative relation with said last named spring clutch.

2. A multiple speed drive system comprising a rotatable drive shaft, a drive pulley on said shaft in driven relation therewith, a rotatable driven shaft spaced from said drive shaft, a high speed pulley and a low speed pulley journalled on said driven shaft, an intermediate shaft spaced from said drive and driven shafts, an intermediate high speed pulley and an intermediate low speed pulley ganged together and carried on said intermediate shaft, a belt connecting said drive pulley, said high speed pulley and said intermediate high speed pulley, a belt connecting said low speed pulley and said intermediate low speed pulley, an overrunning spring clutch connecting said low speed pulley with said driven shaft, an overrunning spring clutch connecting said high speed pulley with said driven shaft, and control means in operative relation with said last named spring clutch.

3. The combination of claim 2 wherein said drive shaft is carried by a pivoted support whereby the weight of said shaft applies tension to said first named belt and wherein said intermediate shaft is carried by a pivoted support whereby the weight of said intermediate shaft and pulleys cooperates with the tension of said first named belt to apply tension to said second named belt.

4. The combination of claim 2 wherein said control means comprises a projection from one end of said last named spring clutch and a finger member movable into and out of engagement with said projection.

5. The combination of claim 4 wherein said finger member is actuated by a rotatable cam member driven by power derived from said drive shaft.

6. The combination of claim 2 wherein said control means comprises mechanism engaging one end of said last named spring clutch to stop rotation thereof and a rotatable cam connected with said mechanism for actuating same, said cam being driven by power derived from said drive shaft.

7. A multiple speed drive system comprising a driven shaft, a pair of belt and pulley drives driving said shaft, a rotatable cam timing the operation of said shaft, means operatively connected to said shaft and driving said cam, and means operatively connected between said cam and one of said belt and pulley drives alternatively connecting and disconnecting said one of said belt and pulley drives with respect to said shaft.

8. A multiple speed drive system comprising a driven shaft having a pair of pulleys mounted for rotation thereon, an intermediate shaft having a pair of pulleys mounted for synchronous rotation thereon, a drive shaft having a single pulley mounted thereon and driven thereby, a belt spanning said drive pulley and one of the pulleys on said intermediate and said driven shafts, a belt spanning the other of said pulleys on said intermediate and said driven shafts, and clutch means connected between said driven shaft and the pulleys mounted thereon.

9. A multiple speed drive system comprising a driven shaft having a pair of pulleys mounted for rotation thereon, an intermediate shaft having a pair of pulleys mounted for synchronous rotation thereon, a drive shaft having a pulley mounted thereon and driven thereby, a belt spanning one of the pulleys on each of said shafts, a belt spanning a pulley on said intermediate and said driven shafts, and an overrunning clutch connecting each of said pulleys on said driven shaft to said driven shaft.

10. A multiple speed drive system comprising a driven shaft having a pair of pulleys mounted for rotation thereon, means driving said pulleys at different speeds, clutch means connecting said pulleys to said shaft, timing means connected to and driven by one of said pulleys for controlling the operation of said shaft, and means connected to said timing means and engageable with said clutch means for controlling said clutch means.

11. A multiple speed drive system comprising a driven shaft having a pair of pulleys mounted for rotation thereon; rotary first and second power driven means driving said pulleys at different speeds and including speed reduction means connected to one of said pulleys; first and second overrunning spring clutches, one being operatively connected to one of said pulleys, the other being operatively connected to the other of said pulleys, and both being operatively connected to said shaft; and timer means operatively connected with the clutch connected with the higher speed pulley for controlling the function of said clutch.

12. A multiple speed drive system comprising a driven shaft having a pair of pulleys mounted for rotation thereon; rotary first and second power driven means driving said pulleys at different speeds and including speed reduction means connected to one of said pulleys; first and second overrunning clutches, one being operatively connected to one of said pulleys, the other being operatively connected to the other of said pulleys, and both being operatively connected to said shaft; and control means operatively connected with the clutch connected with the higher speed pulley for controlling the function of said clutch.

References Cited in the file of this patent

UNITED STATES PATENTS

| Number | Name | Date |
|---|---|---|
| 1,843,523 | Starkey et al. | Feb. 2, 1932 |
| 1,909,420 | Palmgren | May 16, 1933 |
| 2,316,131 | Cardwell | Apr. 6, 1943 |
| 2,337,586 | Bowen | Dec. 28, 1943 |
| 2,452,008 | Wickwire et al. | Oct. 19, 1948 |
| 2,538,667 | Chamberlin | Jan. 16, 1951 |
| 2,568,134 | Tharpe | Sept. 18, 1951 |